US 6,722,961 B2

(12) United States Patent
Solanellas

(10) Patent No.: US 6,722,961 B2
(45) Date of Patent: Apr. 20, 2004

(54) POLISHING MACHINE FOR WHEEL RIMS

(75) Inventor: Joan Llutart Solanellas, Artes (ES)

(73) Assignee: Maquinaria Electronica, Esmerilado Y Pulido S.A., Artes (ES)

(*) Notice: Subject to any disclaimer, the term of this patent is extended or adjusted under 35 U.S.C. 154(b) by 22 days.

(21) Appl. No.: 09/883,909

(22) Filed: Jun. 18, 2001

(65) Prior Publication Data
US 2002/0019203 A1 Feb. 14, 2002

(30) Foreign Application Priority Data
Jun. 27, 2000 (ES) .......................... 200001586

(51) Int. Cl.$^7$ ................................. B24B 7/00
(52) U.S. Cl. ...................... 451/177; 451/140; 451/143; 451/146; 451/150; 451/152
(58) Field of Search ................ 451/140, 143, 451/146, 150, 152, 242, 246, 254, 397, 398, 402, 177, 123, 134, 172, 189

(56) References Cited

U.S. PATENT DOCUMENTS

| 452,004 | A | * | 5/1891 | Mcgehe | 451/254 |
| 765,199 | A | * | 7/1904 | Robinson | 451/182 |
| 862,724 | A | * | 8/1907 | Fields | 451/254 |
| 887,554 | A | * | 5/1908 | Wadsworth | 33/21.4 |
| 1,892,364 | A | * | 12/1932 | Raule | 125/11.21 |
| 2,915,766 | A | * | 12/1959 | Peterson | 15/21.1 |
| 3,137,976 | A | * | 6/1964 | Cooper | 451/254 |
| 3,977,131 | A | * | 8/1976 | Searle et al. | 451/10 |
| 4,084,357 | A | * | 4/1978 | Moses | 451/77 |
| 4,662,125 | A | * | 5/1987 | Brenner et al. | 269/218 |
| 4,848,122 | A | * | 7/1989 | Sullivan | 29/90.1 |
| 5,175,900 | A | * | 1/1993 | Hadgis | 15/97.1 |
| 6,217,424 | B1 | * | 4/2001 | Stephens | 451/254 |
| 6,248,005 | B1 | * | 6/2001 | Ozaki | 451/254 |
| 6,261,160 | B1 | * | 7/2001 | Hakomori | 451/209 |

FOREIGN PATENT DOCUMENTS

ES 9602541 9/1996

* cited by examiner

Primary Examiner—Lee D. Wilson
(74) Attorney, Agent, or Firm—D. Peter Hochberg; Sean Mellino; Katherine R. Vieyra

(57) ABSTRACT

It comprises a plurality of carrying units mounted on a turntable, with each of the carrying units securing a wheel rim or the like to be polished, and a plurality of polishing units, each one of which includes a polishing element that carries out a polishing operation on the wheel rim, in such a way that for each position of the turntable each one of the carrying units is situated facing a polishing unit. It is characterized in that the central shaft of each carrying unit is inclined with respect to the horizontal by a predetermined angle. It permits to polish a wheel rim or the like completely, and it is not necessary to polish manually the parts of the wheel rim which it is more difficult to reach.

9 Claims, 3 Drawing Sheets

POLISHING MACHINE FOR WHEEL RIMS

This invention relates to a machine for polishing wheel rims and the like, which permits the wheel rims to be polished without requiring subsequent manual polishing of the zones of most difficult access.

BACKGROUND OF THE INVENTION

There currently exist rotary polishing machines which carry out polishing of a piece as that piece passes through a number of polishing units. In all these machines each carrying unit is driven by means of a positioning motor, which places the piece to be polished in a suitable position for carrying out the polishing operation to be carried out on each polishing unit.

Such motors are usually mounted on the table, that is, beside the carrying unit, and they rotate at the same time as the latter. The main disadvantage of the known machines is the power supply of the motor, due to the fact that the motor rotates with the table. This disadvantage is currently resolved by providing power to the machines by means of brushes. However, owing to the fact that each polishing unit carries out different operations depending on the polishing unit with which it works, it is costly and complex to achieve positioning of the piece using a conventional motor. This disadvantage means that motors of another type, usually known as Brushless motors, have to be fitted. Said motors permit precise positioning of the piece in each polishing unit, but they have the disadvantage that the electricity supply has to be very precise, which cannot be achieved using brushes.

The polishing machine described in Spanish utility model U9602541, from the holder of this application, was designed in order to resolve these disadvantages, for on it each polishing unit has associated a positioning motor for the carrying unit which is situated facing the polishing unit. Moreover, the carrying unit which is situated facing a polishing unit is coupled to the corresponding positioning motor by means of a shaft that moves vertically by kinetic force attached to the carrying unit, whose lower end is coupled to a base piece attached in rotation to the motor when, upon rotation of the table, the carrying unit is situated facing the polishing unit.

At present, the polishing of wheel rims is carried out entirely manually or by adapting the currently known polishing machines for the polishing of wheel rims, such as that described in Spanish utility model U9602541.

However, this machine which resolved the drawbacks outlined above has been shown to be not very suitable for polishing very complex pieces, such as wheel rims, which can have designs that differ markedly from one another. It has been found in practice that the wheel rim zones of most difficult access are not left suitably polished, and have to be polished manually.

DESCRIPTION OF THE INVENTION

The polishing machine of the invention manages to resolve the aforesaid drawbacks, while presenting other advantages which are described below.

The polishing machine of the invention for wheel rims and the like comprises a plurality of carrying units mounted on a turntable, with each of the carrying units securing a wheel rim or the like to be polished, and a plurality of polishing units, each one of which includes a polishing element that carries out a polishing operation on the wheel rim, in such a way that for each position of the turntable each one of the carrying units is situated facing a polishing unit, and is characterized in that the central shaft of each carrying unit is inclined with respect to the horizontal by a predetermined angle.

Thanks to this feature, it is possible to polish a wheel rim or the like completely, since access to the internal surface thereof is much easier than on the currently known polishing machines. With the polishing machine of this invention it is not necessary to polish manually the parts of the wheel rim which it is more difficult to reach.

Preferably, said predetermined angle is between 35° and 55°.

Advantageously, the central shaft of each of the aforesaid polishing elements is perpendicular to the tangent of the turntable.

In order to achieve correct polishing of the entire surface of the wheel rim, the polishing unit rotates around a horizontal shaft parallel to the tangent of the turntable.

Preferably, each carrying unit includes means for securing the wheel rim or the like, which means are driven fluid dynamically.

Also preferably, said carrying units rotate around their inclined central shaft.

In order to drive their rotation, each carrying unit has an associated fixed motor situated on the turntable, the rotation shaft of the motor being coupled to means of transmitting the rotation to the carrying unit.

Advantageously, the polishing units can move towards and away from the turntable and can also move vertically. Moreover, the polishing units can also move laterally parallel to the tangent of the table.

So that the movements of the machine as a whole are suited to the design of the wheel rim or the like to be polished, the machine includes control means that synchronize the movements of the carrying units and the polishing units.

BRIEF DESCRIPTION OF THE DRAWINGS

For a better understanding of all that has been set out, some drawings are attached which show, schematically and solely by way of non-restrictive example, a practical case of embodiment.

DESCRIPTION OF A PREFERRED EMBODIMENT

Figure 1:
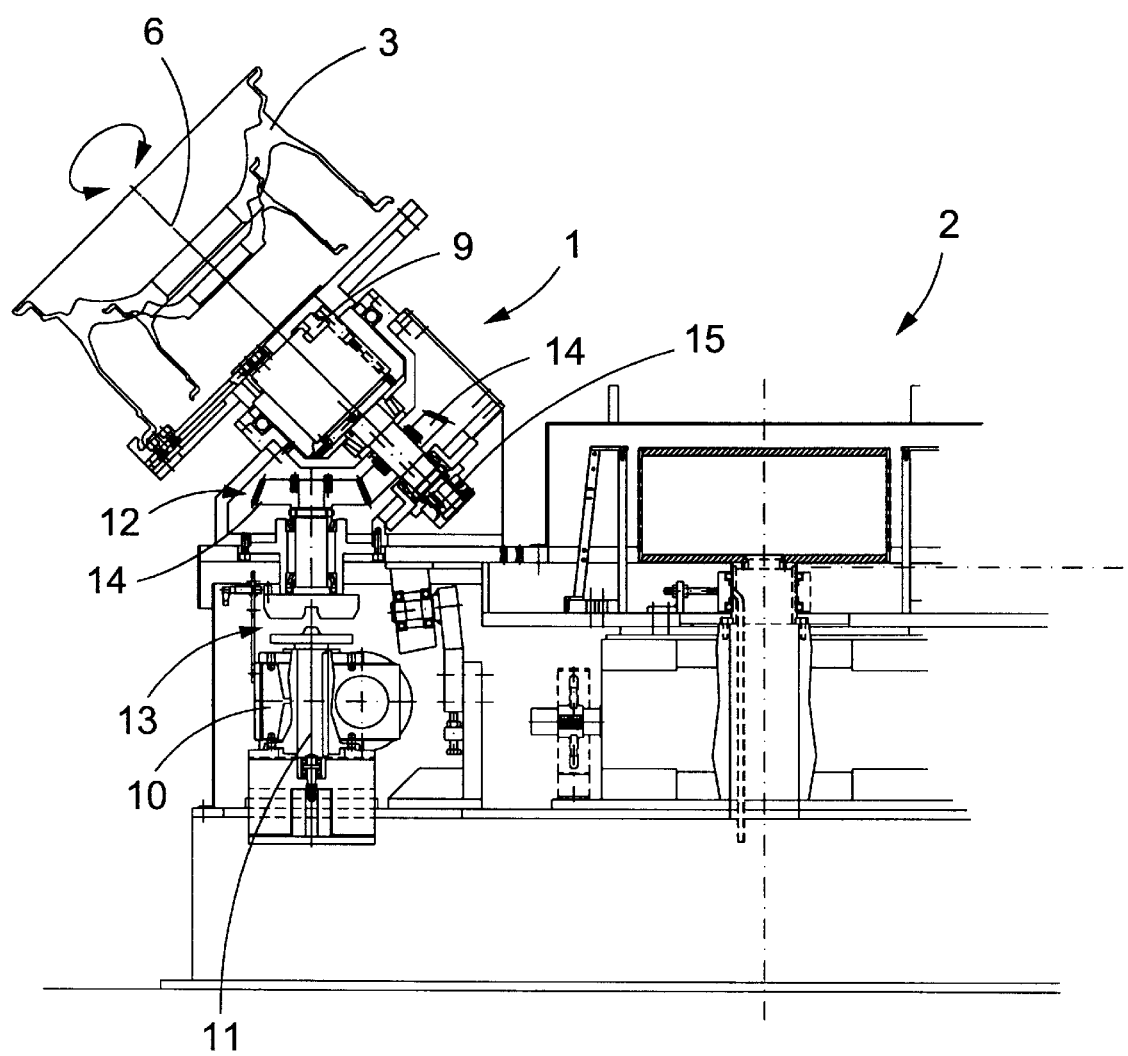
FIG. 1 is an elevation view of half of the turntable in cross-section, showing a carrying unit of the wheel rim in cross-section.

The polishing machine of this invention comprises a plurality of carrying units 1 (only one of which has been shown in FIG. 1) situated on a turntable 2.

Figure 2:
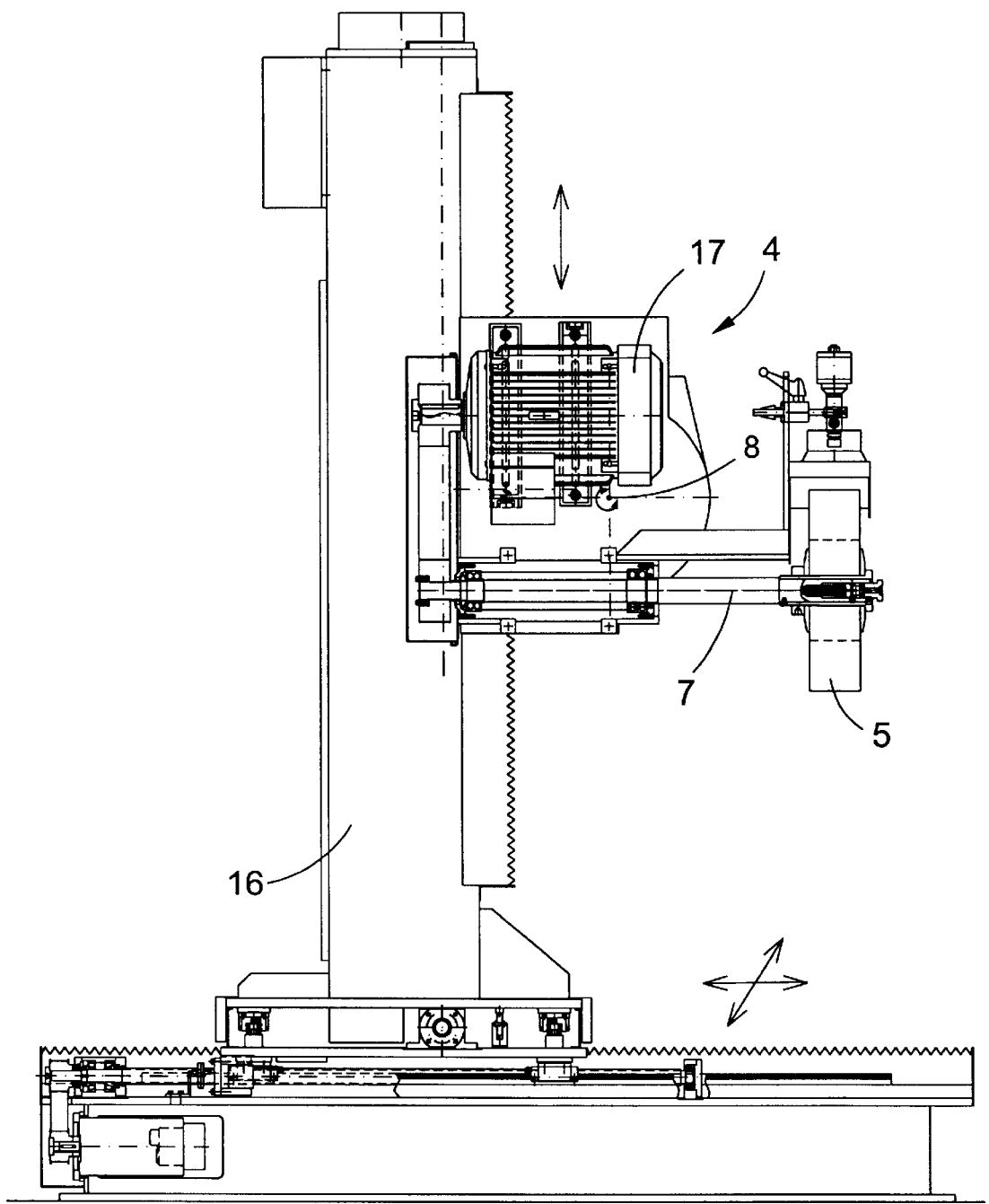
FIG. 2 is an elevation view of a polishing unit, in which some of its parts are in cross-section.
Figure 3:
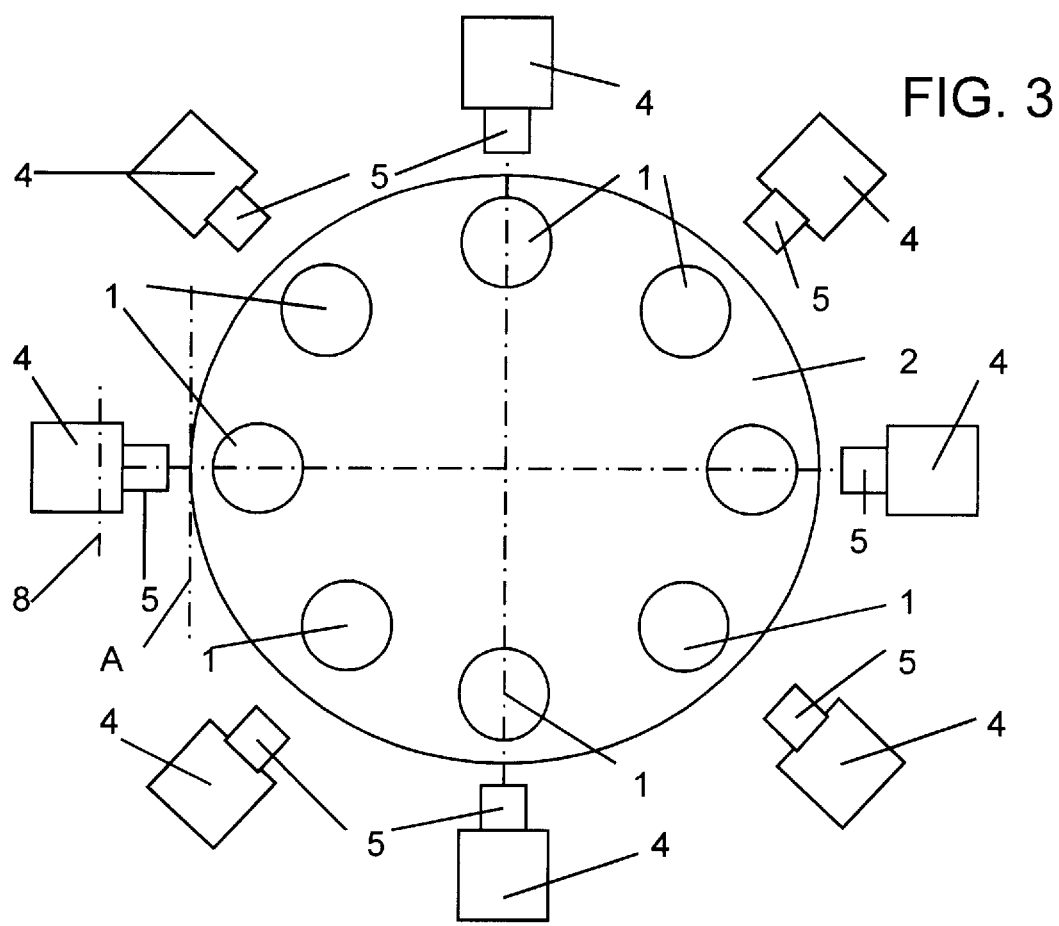
FIG. 3 is an overhead view of a turntable showing a plurality of carrying units and polishing units.

Each of the carrying units 1 secures a wheel rim 3, in such a way when the turntable 2 rotates each carrying unit 1 will be left situated facing a polishing unit 4 (shown in FIG. 2), on which the polishing action will be carried out on part of the wheel rim 3. Thus, when the wheel rim 3 has passed through all the polishing units 4 of the machine of this invention, the polishing of the entire surface of the wheel rim 3 will have been completed.

In order to facilitate polishing of the internal surface of the wheel rim 3, the central shaft 6 of the carrying units 1 is inclined with respect to the horizontal by approximately 45°.

The carrying units 1 rotate around their central shaft 6. In order to drive this rotation movement each carrying unit 1 includes a motor 10 associated with each such unit. This motor 10 is fixed and is mounted on the turntable 2, although it does not rotate with it.

The rotation movement is transmitted through the rotary shaft 11 of the motor, which, through means of transmission 12 of this movement, causes rotation of the wheel rim around its central shaft 6. These means of transmission 12 are made up of a clutch system 13 and a pair of gearwheels 14.

The clutch system 13 which is used on the polishing machine of this invention is identical to the clutch system used on the polishing machine described in Spanish utility model U9602542 by the holder of this application, and is therefore not explained in detail because it is known.

The wheel rim 3 is secured by means of a number of movable clamps 9 which are driven fluid dynamically, in such a way that in one position they secure the wheel rim 3 and in another position they release it. In order to permit the supply of fluid to these clamps 9, each carrying unit 1 includes a rotary joint 15 which is connected to a fluid feed system (not shown).

For their part, the polishing units 4 (FIG. 2) are mounted on a post 16. This post 16 can move towards and away from the turntable 2. In its turn, the polishing unit 4 can move vertically along the post 16. Moreover, the polishing units 4 can move laterally parallel to the tangent of the table 2.

The polishing unit 4 includes a polishing element 5 that rotates around its central shaft 7, which is shown horizontal and perpendicular to the tangent A of the turntable 2.

In addition to the movements described above, the polishing unit 4 can also carry out a rotary movement around the horizontal shaft 8 parallel to the tangent of the turntable 2. Better polishing of the inner surface of the wheel rim is achieved thereby.

The polishing unit 4 also includes a motor 17 for driving the aforesaid movements it makes.

It should be stated, by way of example, that the vertical movement of the polishing unit can be driven by means of the device described in Spanish utility model U9602543, by the same holder as this application. Furthermore, the polishing element 5 is mounted on the shaft 7 by means of the rapid-fixing device described in Spanish utility model U9700814, by the same holder as this application.

The polishing machine of this invention operates as follows.

Firstly, the wheel rim 3 is placed on a carrying unit 1, being secured by means of the pneumatically driven clamps 9.

The turntable 2 then carries out its first rotary movement, leaving the carrying unit situated facing a polishing unit 4. In this position the shaft 11 of the motor is coupled to the transmission system 12 through the clutch 13. In this way, the motor 10 will drive the movement of rotation around the inclined central shaft 6 of the wheel rim 3.

On the polishing unit 4, suitable movements are implemented so that the polishing element 5 is placed in the right position and carries out appropriate movements to polish all zones of the wheel rim 3, including those most difficult to reach.

All these movements are controlled by control means (not shown), which synchronize all the movements of the components of the polishing machine of this invention in order to carry out correct polishing of the wheel rim in accordance with the design of the latter.

Once polishing of one part of the wheel rim 3 has been carried out, the turntable 2 will rotate again until the carrying units 1 are situated facing the corresponding polishing units 4, so that on each polishing unit 4 one part of the wheel rim is polished. Thus, once a wheel rim 3 has passed through all the polishing units 4 a complete polishing of the wheel rim will have been achieved.

Although reference has been made to one specific embodiment of the invention, it will be clear to a person skilled in the art that the polishing machine described lends itself to many variations and modifications, and that all the details mentioned could be replaced by others that are technically equivalent, without departing from the scope of protection defined by the attached claims.

What is claimed is:

1. Machine for polishing wheel rims having exteriors and interiors, said machine comprises a plurality of carrying units mounted on a turntable, with each of the carrying units having a central shaft and each of the carrying units securing a wheel rim to be polished, and a plurality of polishing units, each one of which includes a polishing element that carries out a polishing operation on the wheel rim, in such a way that for each position of the turntable each one of the carrying units is situated facing a polishing unit, wherein the central shaft of each carrying unit is inclined with respect to the horizontal by a predetermined angle between 35° and 55° for facilitating polishing of the interior of the wheel rim.

2. The polishing machine as claimed in claim 1, wherein the polishing unit rotates around a horizontal shaft parallel to the tangent of the turntable.

3. The polishing machine as claimed in claim 1, wherein each carrying unit includes means securing the wheel rim, which means are driven fluid dynamically.

4. The polishing machine as claimed in claim 1, wherein said carrying units rotate around their in lined central shaft.

5. The polishing machine as claimed in claim 1, wherein each carrying unit has an associated fixed motor situated on the turntable, the rotation shaft of the motor being coupled to means of transmitting the rotation to the carrying unit.

6. The polishing machine as claimed in claim 1, wherein the polishing units can move toward from the turntable.

7. The polishing machine as claimed in claim 1, wherein the polishing units can move laterally parallel to the tangent of the table.

8. The polishing machine as claimed in claim 1, wherein the polishing units can move vertically.

9. The polishing machine as claimed in claim 1, wherein it includes control means that synchronize the movements of the carrying units and the polishing units, suited to the design of the wheel rim to be polished.

* * * * *